(12) United States Patent
Janke et al.

(10) Patent No.: US 9,051,841 B2
(45) Date of Patent: Jun. 9, 2015

(54) COOLED TURBINE BLADES FOR A GAS-TURBINE ENGINE

(75) Inventors: Erik Janke, Berlin (DE); Jens Taege, Schöneiche (DE); Thomas Schiessl, Koenigswusterhausen (DE); Sebastian Meier, Gesees (DE); Heinz-Peter Schiffer, Darmstadt (DE); Nils Winter, Neu-Isenburg (DE); Knut Lehmann, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 818 days.

(21) Appl. No.: 13/241,440

(22) Filed: Sep. 23, 2011

(65) Prior Publication Data

US 2012/0076665 A1    Mar. 29, 2012

(30) Foreign Application Priority Data

Sep. 23, 2010  (DE) .......................... 10 2010 046 331

(51) Int. Cl.
F01D 5/18 (2006.01)

(52) U.S. Cl.
CPC .......... *F01D 5/187* (2013.01); *F05D 2240/121* (2013.01); *F05D 2250/25* (2013.01); *F05D 2250/322* (2013.01); *F05D 2260/2212* (2013.01); *Y02T 50/676* (2013.01); *F01D 5/186* (2013.01)

(58) Field of Classification Search
CPC .......... F01D 5/18; F01D 5/187; F01D 5/186; F05D 2260/201; F05D 2260/202; F05D 2260/209; F05D 2260/2212

USPC .......................... 415/115; 416/95, 96 R, 97 R
See application file for complete search history.

(56) References Cited

U.S. PATENT DOCUMENTS

| | | | |
|---|---|---|---|
| 3,191,908 A | 6/1965 | Bowen et al. | |
| 6,033,181 A * | 3/2000 | Endres et al. | 416/97 R |
| 6,071,075 A | 6/2000 | Tomita et al. | |
| 6,164,912 A | 12/2000 | Tabbita et al. | |

(Continued)

FOREIGN PATENT DOCUMENTS

| | | |
|---|---|---|
| DE | 19807563 | 9/1998 |
| DE | 10053356 | 5/2002 |

(Continued)

OTHER PUBLICATIONS

German Search Report dated Jul. 15, 2011 from counterpart application.

(Continued)

*Primary Examiner* — Dwayne J White
*Assistant Examiner* — Ryan Ellis
(74) *Attorney, Agent, or Firm* — Timothy J. Klima; Shuttleworth & Ingersoll, PLC (57) ABSTRACT

The present invention relates to a cooled turbine blade for a gas-turbine engine having at least one cooling duct (14) extending radially, relative to a rotary axis of the gas-turbine engine, inside the airfoil and air-supply ducts (12) issuing into said cooling duct, characterized in that the cooling duct (14) extends into the blade root (6) in order to generate close to the wall a cooling airflow moved at high circumferential velocity and radially in helical form and that in the area of the blade root (6) at least one nozzle-shaped air-supply duct (12) issues into the cooling duct (14) tangentially or with a tangential velocity component.

9 Claims, 5 Drawing Sheets

(56) References Cited

U.S. PATENT DOCUMENTS

| | | | |
|---|---|---|---|
| 6,183,198 B1* | 2/2001 | Manning et al. | 416/97 R |
| 6,547,525 B2 | 4/2003 | Haehnle et al. | |
| 6,609,884 B2* | 8/2003 | Harvey | 415/115 |
| 7,128,533 B2* | 10/2006 | Liang | 416/97 R |
| 7,137,781 B2* | 11/2006 | Harvey et al. | 416/96 A |
| 7,665,965 B1 | 2/2010 | Liang | |
| 7,997,865 B1* | 8/2011 | Liang | 416/92 |
| 2004/0219017 A1 | 11/2004 | Liang | |
| 2006/0056967 A1 | 3/2006 | Liang | |
| 2006/0280607 A1 | 12/2006 | Harvey et al. | |
| 2009/0317258 A1* | 12/2009 | Tibbott et al. | 416/97 R |
| 2010/0040480 A1 | 2/2010 | Webster et al. | |

FOREIGN PATENT DOCUMENTS

| | | |
|---|---|---|
| DE | 69930916 | 8/2006 |
| EP | 1197636 | 4/2002 |
| EP | 1201879 | 5/2002 |
| EP | 1630352 | 3/2006 |
| EP | 2107215 | 10/2009 |
| WO | 96/15358 | 5/1996 |

OTHER PUBLICATIONS

European Search Report dated Jul. 8, 2013 from application No. 11007790.6.

* cited by examiner

Fig. 5

COOLED TURBINE BLADES FOR A GAS-TURBINE ENGINE

This application claims priority to German Patent Application DE102010046331.0 filed Sep. 23, 2010, the entirety of which is incorporated by reference herein.

This invention relates to cooled turbine blades for a gas-turbine engine having at least one cooling duct extending radially, relative to a rotary axis of the gas-turbine engine, inside the airfoil and air-supply ducts issuing into said cooling duct.

A turbine blade known from DE 100 53 356 A1 has, for efficient inner cooling, an internal leading-edge cooling duct of round duct cross-section and cooling-air supply holes arranged one above the other over the length of the cooling duct and issuing from a coolant duct provided in the blade substantially tangentially into the leading-edge cooling duct and generating cooling-air vortices inside the latter in order to obtain a high cooling effect.

US 2006/0280607 A1 describes a turbine blade having a cooling chamber conically tapering in the longitudinal direction of the blade. Cooling air is introduced from a coolant duct, adjacent to the leading-edge cooling duct inside the blade, from a plurality of injection ducts provided over its entire height tangentially into the cooling duct, the conical shape of which effects the formation of helical cooling-air vortices for absorbing heat.

A turbine blade having a plurality of radially extending cooling ducts is known from US 2006/0056967 A1, where the cooling medium is passed tangentially, through one or more metering holes arranged in a wall separating the leading-edge cooling duct from the blade root, into the leading-edge cooling duct and swirled in the latter. The inner surfaces of the leading-edge cooling duct are provided with guidance strips to increase the turbulences in the cooling medium.

The present invention, in a broad aspect, provides a design of rotor blades and/or stator vanes with inner cooling for gas-turbine engines that enables an improved cooling effect.

It is a particular object of the present invention to provide solution to the above problems by a turbine blade designed in accordance with the features described herein.

Advantageous developments of the present invention will become apparent from the present description claims.

The basic idea of the invention is that the cooling air is blown tangentially at high velocity into a cooling duct extending in the longitudinal direction (e.g. radial direction, relative to the rotary axis of the gas-turbine engine) of the airfoil, in particular into the leading-edge cooling duct, in order to move in a vortex or cyclone-like form at high circumferential velocity $v_{tan}$ at the cooling duct wall helically in the axial direction along the duct. As a result of the high local velocity near the wall and the cooling airflow concentrated on the area close to the wall, the Reynolds number increases and the boundary layer thickness decreases, such that the inner heat transmission and the cooling effect of the cooling medium introduced into the blades are considerably improved. Due to the resultant reduced cooling air demand, the efficiency of the turbine is increased. On the other hand, the service life of the blades can be prolonged by an improved cooling effect.

The specific generation of a vortex flow with a certain minimum strength (swirl coefficient) in the cooling air duct has several effects permitting the required increased heat transmission between fluid and wall:

1. Additionally to the axial flow through the cooling air duct, the cooling airflow has a tangential component. As a result, the Reynolds number increases and the boundary layer thickness decreases, such that the inner heat transmission is considerably improved.

2. The swirl flow introduced at the lower end of the cooling air duct is subject to a pressure equilibrium radial to the cooling air duct axis (equation (1))

$$\frac{\partial p}{\partial r} = \frac{\rho v_{tan}^2}{r} \quad (1)$$

that causes a low pressure on the duct axis and a high pressure in the area near the wall. Due to the dissipation of the swirl (weakening of $v_{tan}$) with the axial length of the cooling air duct, the pressure gradient between the duct centre and the duct wall decreases in accordance with equation (1). This leads in the central area (close to the axis) of the cooling air duct to an axial return flow which in turn results in an increased axial forward flow close to the duct wall. This effect generates the required high axial and tangential velocities close to the duct wall (as described above under item 1), resulting in high heat transfers.

3. A further effect of the vortex flow with a certain minimum strength is the exploitation of boundary layer instabilities at concave walls. The resultant vortex structures have a high degree of turbulence and thus make a major contribution to an increase in heat transfer. The formation of vortex structures is based on the velocity gradient $dV_{tan}/dr$. The centrifugal forces on a flow line away from the wall are greater than the centrifugal forces of a flow line close to the wall. For that reason, inner fluid layers "press" on layers close to the wall. Since the inner layers cannot move outwards as entire layers, minor instabilities lead to disintegration of the layers and to vortex formation. These vortices exchange fluid in the radial direction (duct centre to wall and vice versa) and thus greatly increase the heat transfer.

Since the generation of turbulence is based on non-stationary boundary layer effects, the manufacture of internal turbulators (ribs) can be dispensed with.

The strength of the vortex flow (cyclone flow) is given by the swirl coefficient. This represents the ratio of rotary pulse to axial pulse inside the duct, equation (2). The aforementioned effects depend heavily on the swirl coefficient. A minimum swirl coefficient of S>=2 at the inlet of the duct is necessary to effectively use the effects for blade cooling.

$$S = \frac{\int_0^R v_{ax} v_{tan} r^2 \, dr}{R \int_0^R v_{ax}^2 \, r dr} \quad (2)$$

This results in a surface ratio of the cross-sectional surfaces of the supply duct to the cross-sectional surface of the cooling air duct of at least 1:2. For an optimum exploitation of the described effects, the swirl coefficient S (in the cross-section of generation) should be in the range 3-6.

The solution in accordance with the present invention thus provides that the cooling air is introduced via (the) at least one air-supply duct in the area of the blade root. This has the crucial advantage that sufficient space is available for the provision of the at least one air-supply duct so that it can be optimally arranged and dimensioned without impairing the flow route and/or affecting the component strength of the blade.

The supply of cooling air from one or several air-supply ducts is here either tangential or at least with a velocity component arranged tangentially to the cross-section of the cooling duct. The cooling duct itself can, in accordance with the present invention, be designed circular or substantially circular. It is also possible to adapt the cross-section of the cooling duct in the inflow area (mouth area) of the air-supply duct in a suitable manner for optimizing the creation of a vortex flow inside the cooling duct.

If two or more air-supply ducts are used, they can be provided at certain positions on the cooling air duct circumference and tangentially thereto.

In a particularly favourable embodiment of the invention, it is provided that the supply of cooling air through the air-supply ducts can have a component axial to the duct axis at the inlet into the cooling duct (cyclone duct).

Supplying of the at least one air-supply duct with cooling air is achieved in accordance with the present invention preferably either through a cavity at the blade root provided preferably underneath the inner platform of the turbine blade, which can be a suction-side or a pressure-side cavity, or alternatively the cooling air can be supplied to the at least one air-supply duct from the underside of the blade root and through it. Here too, the cooling air is introduced into the cooling duct with a tangential component.

It is also possible in accordance with the present invention to design the supply of cooling air via the at least one air-supply duct such that a clockwise or counter-clockwise direction of rotation is obtained.

It is furthermore possible in accordance with the present invention to additionally arrange cooling ribs, positioned axially to the duct axis, inside the cooling duct for reinforcement of the cyclone flow (vortex formation, vortex flow). In addition, it is also possible in accordance with the invention to provide conventional rib cooling. Both of these measures can also be used to support the maintenance of the vortex/cyclone as it weakens over the length of the cooling duct, and/or to increase the cooling effect. The turbulent rib flows result in an increased heat transfer, compensating for a weakening of the swirl/cyclone.

The cooling concept in accordance with the present invention is preferably applied to the leading-edge cooling duct of a rotating turbine blade, but can also be used in other cooling ducts extending in the blade longitudinal direction and for cooling of the stationary guide vanes of the turbine.

In a further embodiment of the invention, the cooling duct has a substantially circular cross-sectional area at least in the discharge area of the nozzle-shaped air-supply ducts for providing the cyclone-like airflow rotating close to the wall.

In an advantageous development of the invention, the air-supply ducts may have a curved form in the radial direction (relative to the rotary axis of the gas-turbine engine) or in the axial direction (relative to the cooling duct) such that the pumping effect of the rotating blades is improved and a sufficient cooling-air supply to the cooling ducts is assured. For a further improved formation of the cyclone-like rotating airflow in the cooling duct, the air-supply ducts can additionally have a curved form in the circumferential direction of the airflow.

In an embodiment of the invention, the two opposite air-supply ducts issue into the cooling duct at an obtuse angle to the longitudinal axis of the cooling duct in order to provide for helical cooling-air conveying. The inflow can thus contain more or less strong axial components (relative to the longitudinal axis of the cooling duct).

The two opposite air-supply ducts can be provided at a defined point or at two or more points in the longitudinal direction of the cooling duct. The air-supply ducts preferably issue directly above the bottom of the leading-edge cooling duct, starting from a suction-side and pressure-side cavity at the blade root underneath the inner platform of the turbine blade.

In a further embodiment of the invention, the cooling air is drawn out of the cooling duct partly via film cooling holes, which improves or may improve the formation of the cyclone-like cooling-air movement, and/or at the end of the cyclone duct, and/or via air exit openings at the blade tip and/or via diversion into an adjacent cooling duct. In particular with a moderate film cooling air withdrawal of approx. 10 to 50%, the wall heat transfer can be increased. The effect is based on the extraction of the boundary layer flow close to the wall, so that the maximum velocity of the tangential and axial flow close to the wall is retained.

The present invention is more fully described in light of the accompanying drawing showing a preferred embodiment. In the drawing.

Figure 1:
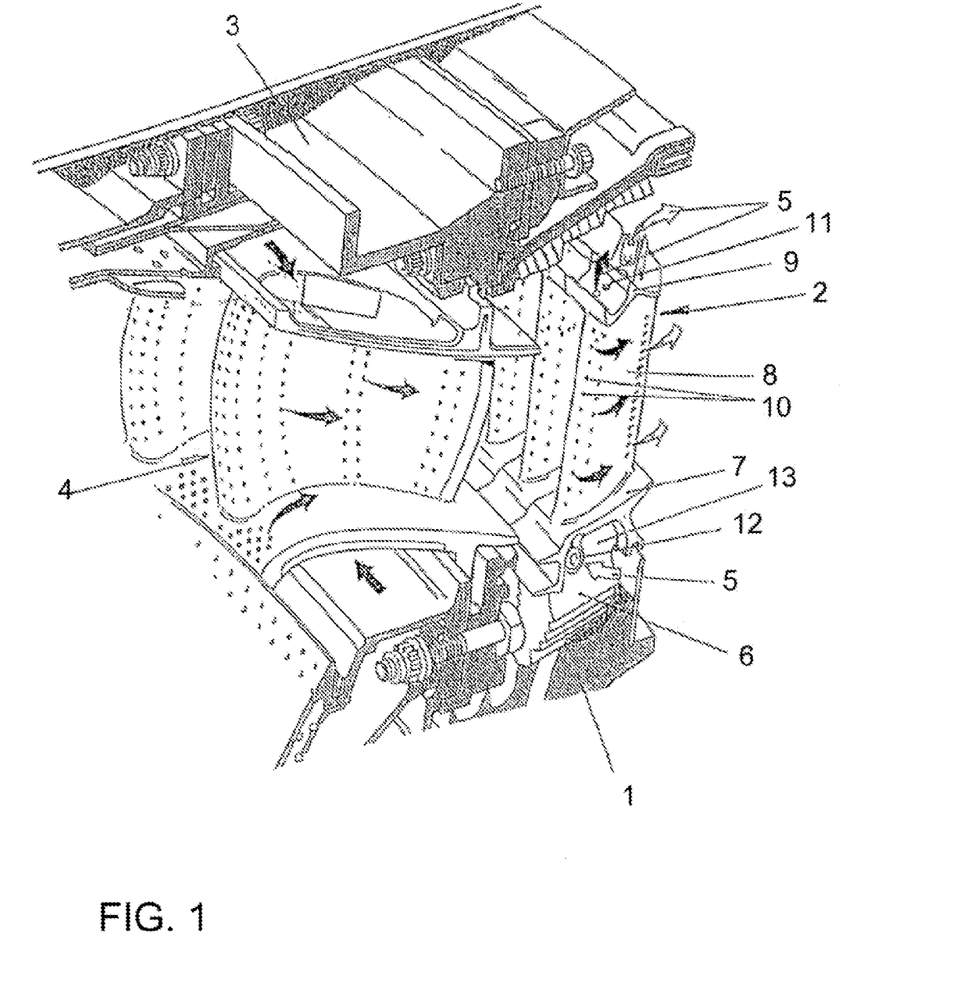
FIG. 1 shows a guide vane and turbine blade arrangement of an aircraft engine.
Figure 2:
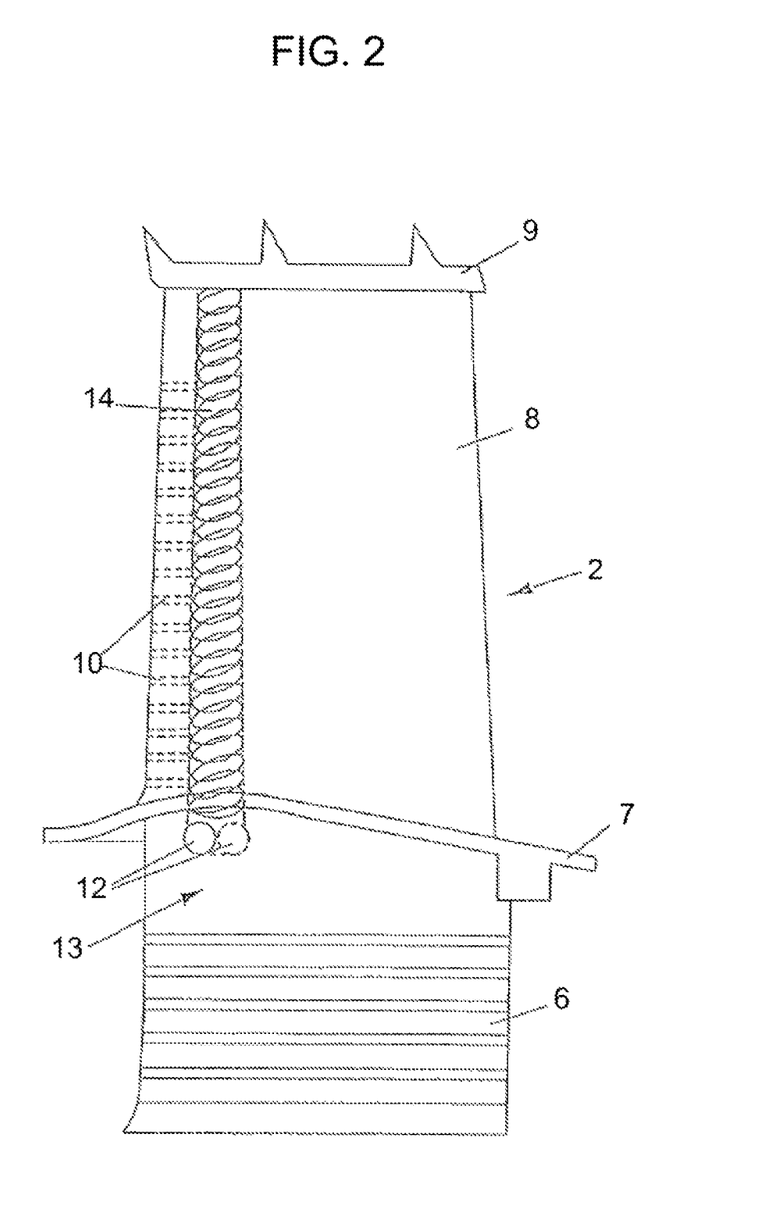
FIG. 2 is a partial view of a turbine blade with tangential cooling-air supply on both sides into the leading-edge cooling duct.
Figure 3:
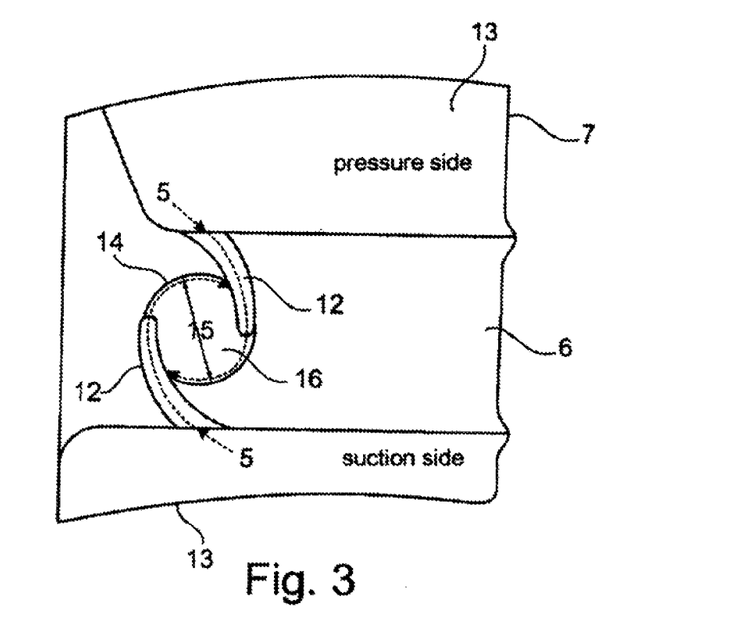
FIG. 3 is a sectional view in the area of the tangential cooling-air supply into the leading-edge cooling duct.
Figure 4:
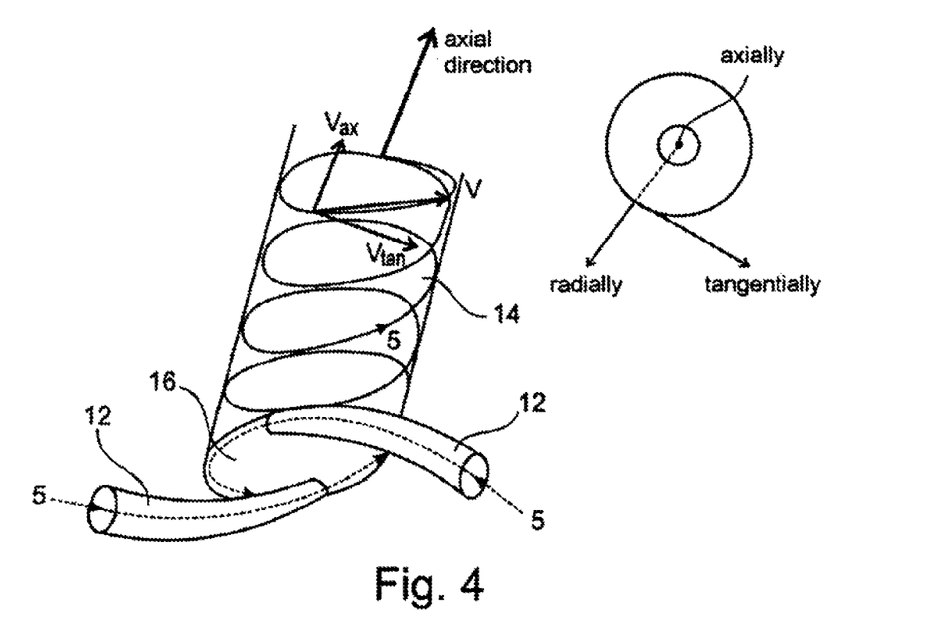
FIG. 4 is a schematic representation merely of the leading-edge cooling duct characterized by the cyclone-shaped wall-near course of flow and of the nozzle-shaped air-supply ducts provided in the blade root and adjoining the cooling duct.

As FIG. 1 shows, the turbine of a gas-turbine engine includes a plurality of turbine blades 2 connected to a rotor disc 1 and guide vanes 4 assigned thereto upstream and attached to the engine casing 3, which are cooled by outer cooling (film cooling) and by inner cooling with cooling air supplied by a compressor and indicated by arrows 5. The turbine blade 2 has a blade root 6 held at the rotor disc 1, an inner platform 7, an airfoil 8 and an outer platform 9. The airfoil 8 designed as a hollow body for inner cooling is provided with cooling ducts and film cooling holes 10 as well as air exit openings 11 on the blade tip. Cooling air (arrow 5) from the cavity 13 present underneath the platforms 9 and between two adjacent turbine blades 2 passes from two opposite sides (suction and pressure sides) through one each air-supply duct 12 extending from the opposite sides of the blade root 6 into the lower section of a leading-edge cooling duct 14 extending inside the turbine blade 2 from the blade root 6 to the blade tip along the blade leading edge (FIGS. 2 to 4). The cooling air 5 supplied to the leading-edge cooling duct 14 flows via film cooling holes 10 intended for outer cooling of the airfoil 8 and via the air exit openings 11 to the outside and/or into further cooling ducts (not shown) located in the airfoil 8.

It is evident from FIGS. 2 to 4 that the air-supply ducts 12 issuing into the leading-edge cooling duct 14 are designed tapering in nozzle shape towards their mouth and tangentially connected opposite to one another, however offset from one another by the diameter of the leading-edge cooling duct 14 at the cooling-air inlet area of largely circular design (arrow 15)

on the bottom 16 of the leading-edge cooling duct 14. Thanks to this arrangement and design of the air-supply ducts 12, the cooling air 5 circulates at high circumferential velocity $v_{tan}$ near the inner wall of the leading-edge cooling duct 14 and additionally moves at an axial velocity $v_{ax}$. in helical form, i.e. in the form of a cyclone in the direction of the blade tip. The physical effects occurring as a result are explained in the foregoing.

The two nozzle-shaped air-supply ducts 12 discharging at the level of the bottom 16 tangentially into the leading-edge cooling duct 14 can have a curved form to support the cyclone-like rotating air movement and furthermore, for controlling the helical axial movement (relative to the center axis of the cooling duct 14) of the cooling-air cyclone, can also be aligned at an obtuse angle to the longitudinal axis of the leading-edge cooling duct 14 or be designed curved in the radial direction for supporting the pumping effect of the rotating blades and for assuring the supply of a high air volume into the leading-edge cooling ducts (the inflow may therefore have more or less strong axial components). The controlled formation of an air movement that circulates cyclone-like and close to the wall is further assisted by a circular cross-sectional design of the leading-edge duct 14 provided in the tangential entry area of the air.

Thanks to the high local cooling air velocity $v_{tan}$ achieved near the wall with the aforementioned arrangement and design of the air-supply ducts 12 and the resultant low boundary layer thickness on the inner wall of the leading-edge duct 14, and thanks to the high turbulence of the cooling air close to the wall on the inner circumference of the cooling duct due to non-stationary boundary layer instabilities, the heat transmission can be increased and the cooling effect of the cooling air 5 supplied into the airfoil 8 can be substantially improved. As a result, the cooling-air requirement and hence the fuel consumption of the engine can be reduced. On the other hand, with a constant cooling-air mass flow the service life of the turbine blades or the turbine inlet temperature and hence the specific thrust can be increased.

The present invention is not limited to the embodiment explained in the above. The proposed cooling principle can be used not only as described above for rotating turbine blades 2, but also for the stationary guide vanes 4 arranged according to FIG. 1 upstream of the rotating turbine blades 2. The cooling-air supply into the leading-edge duct can also be effected from the blade tip.

The cooling air is supplied, as described in the present design example, at the bottom of the leading-edge duct 14 of the turbine blades. It is however also conceivable to introduce additional cooling air in the same way, at an axial distance (relative to the center axis of the cooling duct 14) from the bottom of the cooling duct 14 from a cooling duct adjacent to the leading-edge cooling duct 14 oppositely tangentially into said leading-edge duct.

According to FIG. 1, the cooling air supplied into the turbine blade 2 is discharged via film cooling holes 10 and air exit openings 11 at the blade tip. However, the cooling air rotating at the inner wall of the leading-edge duct can also be diverted into one or more adjacent cooling ducts (not shown). A circumferential velocity as high as possible of the cooling air rotating inside the leading-edge duct, and a boundary layer thickness as low as possible with correspondingly high heat transmission rate, are already achieved in a smooth leading-edge cooling duct without film cooling holes 10 and without film cooling air removal. A further increase of the heat transfer is achieved with moderate film cooling air removal from the cyclone flow. With a cooling duct provided with film cooling holes, the wall-near velocity in the duct is maintained or possibly improved, and a higher heat transmission rate is achieved compared with known cooling arrangements. The effectiveness of film cooling is not impaired by the present cooling concept. Furthermore, it is also conceivable that the main cooling duct of a turbine blade or guide vane of the turbine is cooled in accordance with the cooling principle described above.

Figure 5:
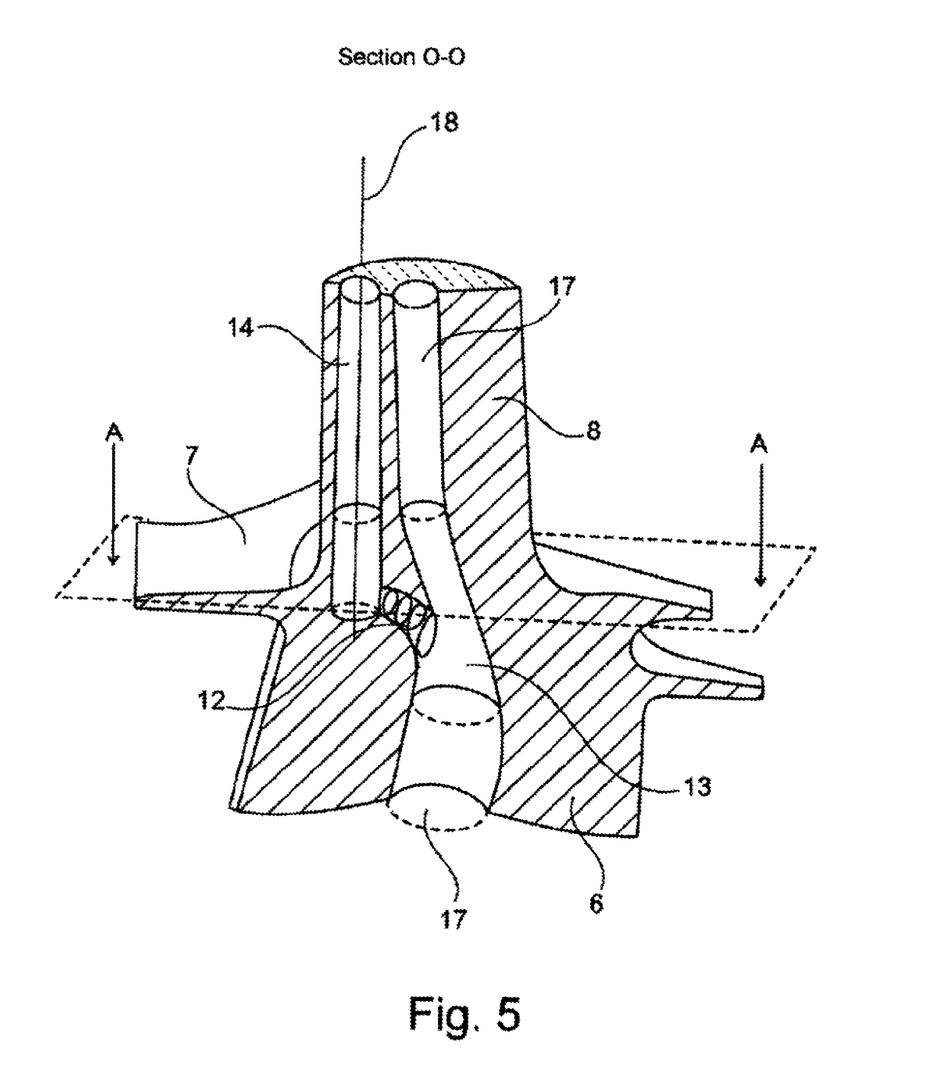
FIG. 5 is a partially perspective sectional view, similarly to FIG. 2 of an exemplary embodiment with an air-supply duct.
Figure 6:
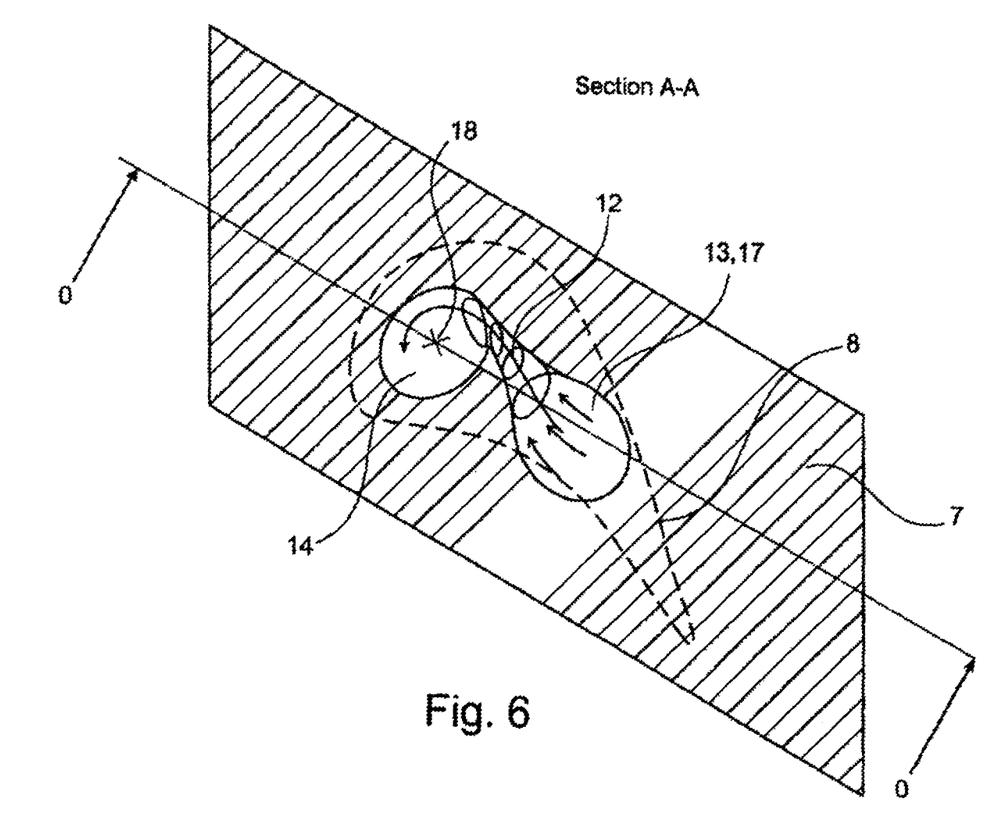
FIG. 6 is a sectional view along line A-A of FIG. 5.

FIGS. 5 and 6 show in a clarifying representation a design variant having only one air-supply duct 12. The latter branches off (see FIG. 5) from a cavity 13 provided in the blade root 6 or from an air duct 17. The air-supply duct is, as shown in FIG. 5, inclined from the radial direction (center axis 18) of the cooling duct 14. This inclination is provided additionally to the tangential arrangement (see FIG. 6) in order to generate a swirl (cyclone).

FIG. 5 furthermore shows a design variant in which an air duct 17 is provided parallel to the cooling duct 14 and also extends in the radial direction in order to convey further cooling air into suitable areas of the blades 2, 8.

LIST OF REFERENCE NUMERALS

1 Rotor disc
2 Turbine blade/airfoil
3 Engine casing
4 Guide vanes
5 Cooling air, rotating cooling-air layer (arrow)
6 Blade root
7 Inner platform
8 Airfoil
9 Outer platform
10 Film cooling hole
11 Air exit opening
12 Nozzle shaped air-supply duct
13 Cavity
14 Cooling duct, leading-edge cooling duct
15 Circular cooling-air inlet area
16 Bottom of 14
17 Air duct
18 Center axis

What is claimed is:

1. A cooled turbine blade for a gas-turbine engine, comprising:
   at least one cooling duct extending radially, relative to a rotary axis of the gas-turbine engine, inside an airfoil of the turbine blade, the at least one cooling duct extending into a root of the blade
   at least two nozzle-shaped air-supply ducts in an area of the blade root issuing into the at least one cooling duct tangentially or with a tangential velocity component to generate a cooling air flow close to a wall of the at least one cooling duct, the cooling airflow being generated to have a circumferential velocity to move radially through the at least one cooling duct in a helical manner;
   the at least two nozzle-shaped air-supply ducts tangentially issuing into the at least one cooling duct in opposite directions and offset from one another by a diameter of the at least one cooling duct.

2. The cooled turbine blade in accordance with claim 1, wherein the at least two nozzle-shaped air-supply ducts are inclined from the radial direction to generate a flow component extending in a longitudinal direction of the at least one cooling duct.

3. The cooled turbine blade in accordance with claim 1, wherein the at least two nozzle-shaped air-supply ducts are connected to at least one chosen from a cavity provided at the blade root and an air duct penetrating the blade root.

4. The cooled turbine blade in accordance with claim 1, wherein the at least one cooling duct has a substantially circular cross-sectional area at least in a discharge area of the nozzle-shaped air-supply ducts.

5. The cooled turbine blade in accordance with claim 1, wherein the at least two nozzle-shaped air-supply ducts have a curved form in the radial direction, to improve a pumping effect of the blade when rotating, and additionally, a curved form in a circumferential direction of the airflow in the at least one cooling duct.

6. The cooled turbine blade in accordance with claim 1, wherein the at least two nozzle-shaped air-supply ducts issue directly above a bottom of the at least one cooling duct.

7. The cooled turbine blade in accordance with claim 1, wherein air entry openings of the at least two nozzle-shaped air-supply ducts are located in a suction-side and pressure-side cavity at the blade root.

8. The cooled turbine blade in accordance with claim 1, and further comprising at least one chosen from film cooling holes and air exit openings at a blade tip and via which the cooling air is drawn out of the at least one cooling duct.

9. The cooled turbine blade in accordance with claim 1, wherein the at least one cooling duct is a leading-edge cooling duct of at least one chosen from a rotating turbine blade and a stationary guide vane.

\* \* \* \* \*